Apr. 17, 1923.
H. L. TANNER
GYROSCOPIC COMPASS
Filed Nov. 8, 1917
1,452,485
2 Sheets-Sheet 1
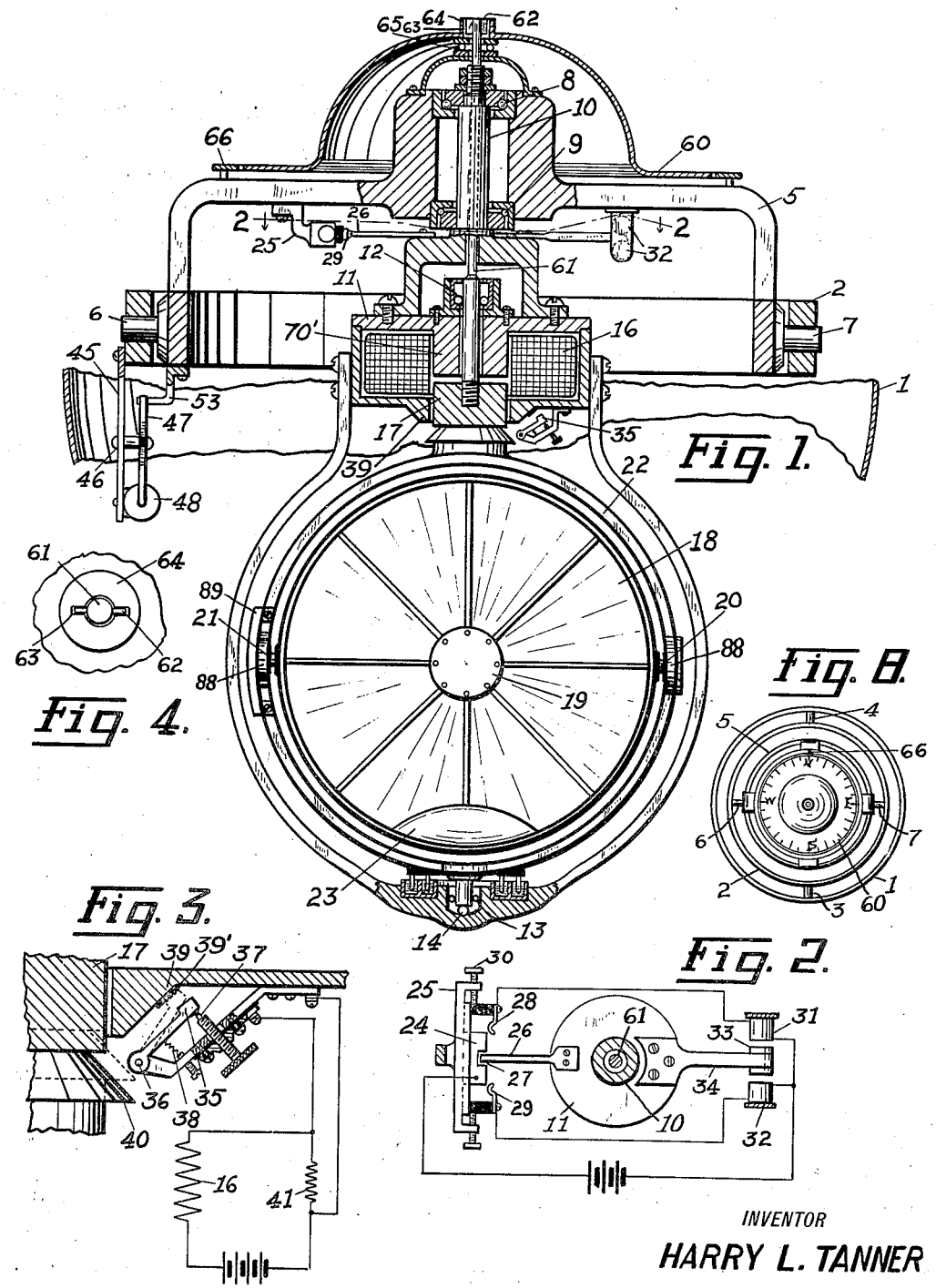
INVENTOR
HARRY L. TANNER
BY
*Herbert H. Thompson*
ATTORNEY.

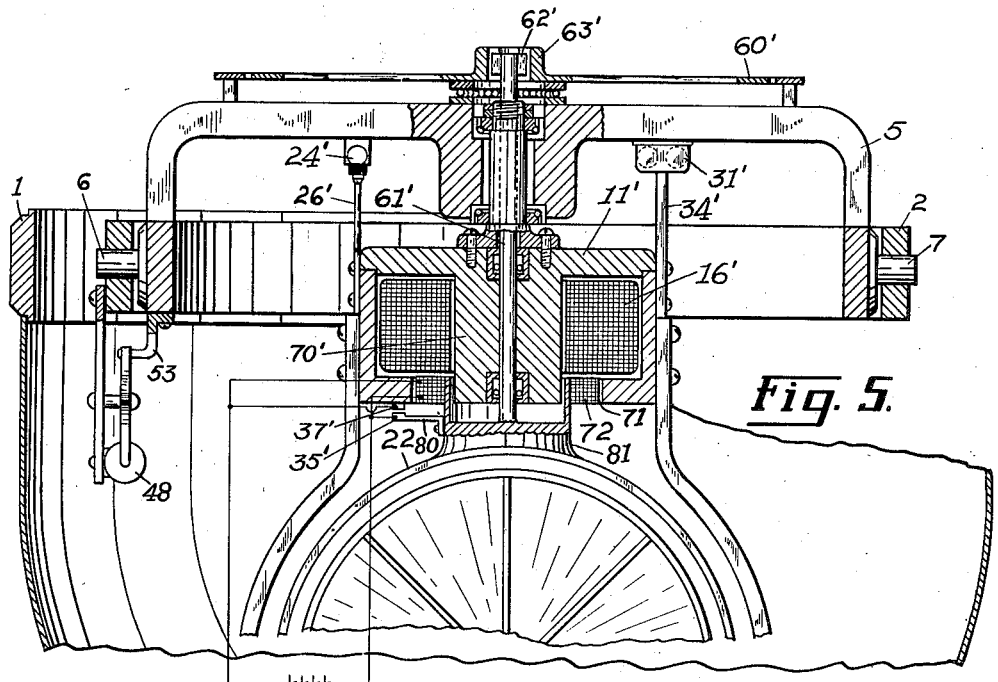

Patented Apr. 17, 1923.

1,452,485

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC COMPASS.

Application filed November 8, 1917. Serial No. 200,889.

*To all whom it may concern:*

Be it known that I, HARRY L. TANNER, a citizen of the United States of America, residing at 1144 East 19th Street, Brooklyn, in the county of Kings and State of New York, have invented certain new and useful Improvements in Gyroscopic Compasses, of which the following is a specification.

This invention relates to gyroscopic compasses and other devices of extreme sensitiveness which require the reduction of friction about the axis of oscillation or orientation to a minimum and the elimination, as far as possible, of disturbing influences.

One of the principal causes of deviation in gyro compasses is friction about the axis of orientation. Another cause, is turning moments about the same axis caused by rolling and pitching of the ship on which the compass is mounted.

The principal object of this invention is to eliminate both of these sources of error.

For eliminating friction about the axis of orientation or about other axes it is not only necessary to provide a frictionless support, but also to eliminate friction in the guide bearings. For the latter purpose, I employ means for maintaining the guide bearings in a continuous state of vibration. This vibration may be lonigtudinal with respect to the bearing, which is hereinafter referred to as reciprocation; or rotary, which may be referred to for convenience as oscillation, or it may be a combination of the two. Preferably also I furnish a magnetic support for the compass about the vertical axis, to provide a frictionless support, as stated.

Referring to the drawings in which what I now consider to be the preferred forms of my invention are shown:

Fig. 1 is a side elevation partly in section of one form of gyro compass embodying my invention.

Fig. 2 is a detail of the mechanism for imparting oscillation to the supporting frame in which the vertical guide bearings are mounted.

Fig. 3 is a detail diagram showing the action of the switch causing reciprocation of the gyroscope within the vertical bearings.

Fig. 4 is a plan view of the center of the compass card showing how it is joined to the vertical stem.

Fig. 5 is an elevation partly in section of a modified form of compass.

Fig. 6 is an elevation of a portion of the compass showing the means used to eliminate the disturbing effects due to rolling of the ship about one axis. The view is taken from within the compass bowl looking out.

Fig. 7 is a similar view showing the means as applied about the other axis. This view is also a side elevation of the central portion of Figs. 1 and 5, looking in.

Fig. 8 is a plan view on a reduced scale of the compass showing the gimbal support therefor.

Fig. 9 is a diagram illustrating the action of the springs shown in Figs. 6 and 7.

Fig. 10 is a diagrammatic view, being an elevation of the central portions of both bearings supporting the gyroscope about a horizontal axis.

The gyroscope is shown as supported within a compass bowl 1 on a gimbal ring 2 which is journaled within the bowl on an axis 3, 4 (Fig. 8). The supporting frame 5 is in turn journaled in the gimbal ring 2 upon trunnions 6 and 7, the compass being thus pendulously and universally supported on a ship for oscillation.

The frame 5 is provided with a vertical boss or hub adapted to support the guide and thrust bearings 8 and 9 for a stem 10 to which is secured the frame 11. Said frame 11 is shown as provided with vertical guide bearings 12 and 13 for the gyro element, also preferably with a thrust bearing 14. A coil of wire 16 is supported within said frame on a stationary core 70' and serves to create a powerful magnetic flux adapted to draw the movable core 17 attached to the gyro element upwardly and thus relieve the thrust bearings of the greater portion or all of the weight of the gyro unit.

The gyroscopic rotor is represented as enclosed within a casing 18 within which the rotor is journaled upon bearings 19. The rotor is preferably electrically driven by a motor also enclosed within said casing, as has now become the standard practice in gyro-compasses. The rotor bearing casing may be rigidly connected to the core 17 so that the gyroscope is pendulously mounted. I prefer to provide horizontal bearings 20 and 21 for said casing within a vertical member or ring 22 secured to magnetic element 17. The said casing is pendulously mounted about axis 20, 21 which may be affected in any manner as by securing a weight 23 to the casing below the axis of support.

In all types of bearings, especially in the so-called anti-friction ball bearings, a large amount of what may be termed static friction exists which is not present when the bearing is being rotated or otherwise moved. The bearings are said to stick or become stiff when the parts are first moved. Such action of the bearings on the gyro compass gives rise to serious deviations since the vertical bearings for instance are only brought into play when the ship changes its course which does not ordinarily occur with great enough frequency to maintain the bearings free of static friction. In order to overcome this defect, I have illustrated a means for maintaining the frame 11 in a constant state of oscillation about the vertical axis. As shown in Fig. 2, a contact block 24 is slidably mounted on extension 25 from frame 5. An extension 26 from support 11 engages a notch 27 in said block and serves to reciprocate the block between the contacts 28, 29 mounted on said member 25. Preferably the contacts are adjustable as by means of set screws 30 so that the extent of oscillation of support may be varied. In circuit with contact 28 on bracket 25 are electromagnets 31 while similar magnets 32 are inserted in circuit with contacts 29 and block 24. The magnetic armature 33 is shown as mounted on an extension 34 from support 11 and reciprocates between the magnets as the contacts are alternately completed, as will be readily apparent from Fig. 2, thus maintaining the frame 11 and the vertical bearings in a state of oscillation.

Means may also be provided for maintaining a longitudinal relative movement of the two parts of the bearings. For this purpose I have shown a switch 35 pivoted at 36 and preferably made of or containing magnetic material. Said switch is normally drawn against adjustable contact 37 by spring 38 or gravity, but is drawn away from said contact when the magnetic flux therethrough becomes sufficient to attract the switch toward magnetic element 39 forming the lower portion of the electro magnetic supporting means secured to frame 11. A block 39' of non-magnetic material may be placed at the point of engagement of switch 35 and element 39 to prevent sticking of the switch. The core 17 is provided with a tapering portion 40 which, when the core is in the lowermost position, as illustrated in Figs. 1 and 3, is an appreciable distance from the switch 35 so that the magnetic flux therethrough is at a minimum. When however the core 17 is raised to the dotted line position in Fig. 3 for instance, the magnetic flux through the switch becomes strong enough to attract the switch away from the contact and break the circuit.

Said switch is used to control the strength of the current through coil 16 and for this purpose may be used to complete a short circuit around the resistance element 41 so that when the switch is closed coil 16 would be at its maximum strength and when open at its minimum strength. Preferably the relative strength of the current in the two instances are so proportioned and the action of the switch so timed that the coil is strengthened before the gyroscopic element drops on to the lower thrust bearing 14 and is weakened before it is raised to its upper limit. A similar arrangement is preferable also with reference to Fig. 2, so that in no case are the vibrating parts brought against fixed stops.

Preferably also friction about the horizontal axis of support of the gyroscope is reduced according to my invention. In the form of the invention shown this axis is at 20—21 at which points the gyro casing 18 is supported within ring 22, although of course it is obvious that the location of this horizontal axis varies for different types of compasses, as explained above. To effect my purpose, the bearing members 85 and 86 which are supported within the bosses 87 and 88 on ring 22 are rotatably mounted within said bosses, and means provided to impart continuous oscillation thereto. A bracket 89 is secured to ring 22 near the boss 87 and has slidably mounted therein a contact block 90 which operates between the contacts 91 and 92 on said bracket. An extension 93 from bearing 85 engages a notch 94 in said block thereby reciprocating the block with the oscillation of the bearing. In circuit with said contacts are electromagnets 95 and 96 which alternately attract the armature 97 extending from said bearing block in a manner similar to that explained with reference to Fig. 2. In a like manner bearing block 86 is oscillated by means of magnets 98 and 99. The said magnets may, if desired, be operated from the same contact block 90 and contacts 91 and 92 without the provision of separate contacts for said magnets as shown in Fig. 10. Preferably also the magnets are so connected that the oscillation of the two bearings takes place in opposite directions about the horizontal axis thereby canceling any torque that may be exerted by oscillation of one bearing by the opposite torque of the other bearing.

The compass card 60 is shown as rotated from a slender stem 61, extending up from core 17 through vertical bearing 12 in member 11 and within and through stem 10. In order that the reciprocation of the gyro unit may not be imparted to the card 60, wings 62 or the like are provided adjacent the outer end of rod 61 which engage slots 63 in central boss 64 on the card. (Figs. 1 and 4). Said card is shown as journaled on bearing 65 and is readable upon lubber scale or line 66.

For eliminating the effects of rolling and pitching of the ship I employ resilient means which is brought into operation by the roll or the pitch of the ship to oppose the acceleration pressures exerted on the gyro compass by said movements. For this purpose I have shown a bracket 45 secured to gimbal ring 2 and supporting the pivot 46 of an irregularly shaped member 47 and a dash pot or other rapid motion-resisting means 48 (see Figs. 1 and 7). Member 48 has two oppositely extending arms 49 and 50 to which are secured springs 51 and 52, the inner ends of the springs being secured to the frame 5 by means of downwardly extending arm 53. Said springs are normally under equal tension which may be adjusted by means of set screws 54 to which the springs are secured. The piston rod 55 or other moving part of the dash pot 48 is linked to arm 56 of member 48 so that the dash pot will prevent any sudden oscillation of the member 48 about the pivot 46 but will permit very slow movement thereof. About the axis 3, 4 of the gimbal ring a similar means is employed, but in this case a member 47' is pivoted upon the bowl 1 or other fixed part with the dash pot 48' secured to the same member, while arm 53' is secured to gimbal ring 2 (Fig. 6). The parts are correspondingly numbered.

As will be understood by those skilled in the art, the compass is placed on the ship with the axes of the gimbals fore and aft and athwartship so that one set of springs acts about each axis. As the rolling motion of the ship is the more pronounced it is, generally speaking, more important that such springs be employed about the fore and aft axes than about the athwartship axis.

The action of this device in resisting acceleration pressures due to rolling and pitching is illustrated diagrammatically in Fig. 9. In this figure the ship is represented as a compound pendulum P oscillating about its metacenter A and the gyroscope is represented by a small pendulum B pivoted at C within a frame D. When the entire pendulum swings to the dotted line position in the diagram, gravity tends to keep it in position B' but acceleration forces due largely to its inertia, acting upon it would tend to swing the pendulum out to a position B''. The extent of this action depends in part of course on the relative periods of the ship and pendulum. In both position B' and B'' it will be observed that the spring 51' has been placed under tension to oppose the acceleration force and will therefore act to lessen the swing of the pendulum about its axis. When the tension of the spring is properly adjusted its force can be made to overcome the disturbing force, thus greatly reducing oscillations of the gyro compass about its gimbal support. If the ship on the other hand should assume a list or inclination for a considerable period of time, it will be seen that the springs would tend to cause the compass to become inclined and impair the accuracy of its readings. It is to prevent this action that springs 51, 52 and 51' and 52' are preferably not connected directly to the ship or to gimbal ring 2 but are connected thereto by levers 47 and 47' and dash pots 48 and 48'. Each dash pot causes member 47 or 47' to remain substantially fixed to the ship during all ordinary rolling or pitching motions. But in case the ship should list, the continuous tension of one of the springs would cause the dash pot to move and thus allow the member 47 to become centralized with respect to the pendulous gyroscope.

A somewhat different form of magnetic support for the compass is shown in Fig. 5. In this figure the vibratory support 11' is again provided with a coil 16', the member 11' having a central magnetic part 70' serving as a core of the winding 16'. An air gap or break in the magnetic circuit is provided at 71 within which is normally located a second coil 72 mounted upon vertical ring 22 of the gyro unit. Both coils are normally energized in such direction that coil 72 is strongly attracted and held within said air gap. By providing a support of this character all side magnetic thrust on the guide bearings is elimited. In this instance the compass cards 60' is again supported on stem 61', the stem being provided with wings 62' engaging the central boss 63' on the card. For imparting vibratory motions to the bearings it is obvious that similar methods may be employed to those shown in Fig. 1. Thus oscillation of the frame 11', by contacts 24' operated from arm 26' secured to member 11', may be caused as before. Magnets 31' and 32' (not shown) are in circuit with the contacts, the armature for the magnets being supported on arm 34' secured to frame 11'.

In order to cause a relative vertical reciprocation of the frame and gyro unit, contacts 35' and 37' may be employed, the latter being secured to frame 11', while the former is secured to frame 22 being preferably mounted on a resilient strip or arm 80 secured to the upstanding boss 81 on ring 22. The contact blocks are preferably made of carbon and when closed short circuit coil 72 so that the gyro unit will drop toward the thrust bearings as before. The contacts are broken by this movement thus opening the short circuit, energizing coil 72 and raising the gyro unit again to make the contact. A resistance element 82 may be placed in parallel with the coil 72 if desired.

A further advantage of this form of magnetic support over the form shown in Fig. 1 lies in the fact that the lifting force on coil 72 and on the gyro-unit becomes less as it approaches coil 16' (within certain limits) so that the gyroscope is supported in stable equilibrium. In Fig. 1 on the other hand, the attraction on armature 17 becomes rapidly greater as it approaches core 70', so that sticking is more likely to occur.

In accordance with the provisions of the patent statutes, I have herein described the principle of operation, of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I desire to secure by Letters Patent is:

1. In a precision instrument, a pair of elements, a bearing for mounting said elements for relative rotation, and means for imparting to said elements a relative vibration in a plurality of planes.

2. In a gyroscopic compass, the combination with a gyroscopic element. a support therefor, a vertical bearing permitting orientation of said element on said support, electro-magnetic means for taking more or less weight of said element off the bearing, and means for causing a relative reciprocatory movement of said element and support within said bearing.

3. In a gyroscopic compass, the combination with a gyroscopic element, a support therefor. a vertical bearing permitting orientation of said element on said support, electro-magnetic means for taking more or less weight of said element off the bearing, and means for varying the strength of said means whereby said element is reciprocated longitudinally within the bearing.

4. In a gyro-compass, an orienting frame, a radial bearing for the frame, magnetic means adjacent the bearing for supporting said frame, a contact for varying the strength of said means, said contact being located so that downward movement of the frame causes the contact to increase the strength of said means.

5. In a gyro-compass, a fixed frame, a support rotatably mounted thereon, a gyroscopic element rotatably mounted on said support, contacts operable between said frame and said support and electro-magnetic means operable therefrom for maintaining said support in a state of vibration.

6. A support for sensitive elements comprising a bearing frame, a support journaled thereon, a sensitive element supported and guided for rotation on said support, contacts operable between said frame and said support and electro-magnetic means operable therefrom for maintaining said support in a state of vibration.

7. In a gyro-apparatus for ships, the combination with a support adapted to be fixed to the ship, of a gyroscopic element pendulously supported therefrom, and resilient means connecting said support and element for exerting a torque during an oscillation of the ship which opposes disturbing forces on the element due to such oscillation.

8. In a gyro-apparatus for ships, the combination with a support, of a gyroscopic element pendulously supported therefrom, and resilient means connecting said support and element, about the fore and aft axis of the ship, for exerting a torque during a roll of the ship which opposes the disturbing forces on the element due to such roll.

9. In a gyro compass for ships, the combination with a support on the ship, of a gyroscopic element pendulously supported therefrom, a movable member, a rapid motion resistive device coupling said member to said support, and resilient means connecting said element and said member for exerting a torque during an oscillation of the ship which opposes the disturbing forces of the element due to such oscillation.

10. In a gyroscopic compass, the combination with a gyro-unit, of means for supporting the same for oscillation about a horizontal axis, comprising a bearing and trunnion, and means for imparting continuous relative vibratory movement to said bearing and trunnion.

11. In a gyroscopic compass, the combination with a gyro-unit, of means for supporting the same for oscillation about a horizontal axis, comprising a plurality of bearings and trunnions, and means for imparting relative oscillatory movement to each of said bearings and trunnions in opposite directions.

12. In a gyro-compass, the combination with a gyro-element, means for supporting the same for orientation in azimuth, means for supporting the same for oscillation about a horizontal axis, and means for maintaining a continuous movement between the gyro-element and each supporting means.

13. In a gyro-apparatus for ships, the combination with a support, of a gyroscopic element pendulously supported therefrom, and means brought into action by inclination of the ship for exerting a torque on the element in the opposite direction to the inclination of the ship.

14. In a gyro-apparatus for ships, the combination with a support, of a gyroscopic element pendulously supported therefrom, and resilient means connecting said support and element, about the transverse axis of the ship, for exerting a torque during pitching of the ship which opposes the disturbing forces on the element due to such pitching.

15. In a gyroscopic compass, the combination with a gyroscopic element, a support therefor, a vertical bearing permitting orientation of said element on said support, an electro-magnet on said support having a vertical air gap, and a coil on said element normally positioned in said gap.

16. In a gyroscopic compass, the combination with a gyroscopic element, a support therefor, a vertical bearing permitting orientation of said element on said support, an electro-magnet on said support having a vertical air gap, a coil on said element normally positioned in said gap, and means for periodically varying the magnetic attraction between said magnet and said coil.

17. In a gyroscopic compass, the combination with a gyroscopic element, a support therefor, a vertical bearing permitting orientation of said element on said support, an electro-magnet on said support having a vertical air gap, a coil on said element normally positioned in said gap, and means for strengthening and weakening the strength of said coil as the element descends and ascends in response thereto.

18. In a gyroscopic apparatus, a gimbal ring pivoted on a support about an axis, a pendulous gyro-member suspended from said ring about an axis at an angle to said first axis, and resilient means connecting said ring and member and adapted to be placed under strain by relative inclination of the ring and member.

19. In gyro-apparatus for ships, the combination with a pendulously supported gyroscopic element, of resilient means connecting said element with a relatively fixed portion for opposing oscillations with respect to the ship.

20. In gyro-apparatus for ships, a support mounted for oscillation about a horizontal axis, a gyro-element journalled on said support for orientation, and resilient means connecting said support and a relatively fixed part about said axis.

21. In gyro-apparatus for ships, a support mounted for oscillation about a horizontal axis, a gyro-element journalled on said support for orientation, a part which is difficultly and slowly yieldable, and resilient means connecting said support and part.

22. In a gyro-compass, the combination with an element mounted for orientation, a gyro-rotor casing, bearings for supporting the same from said element for oscillation about a substantially horizontal axis, and electro-magnetic means operating between said element and casing for imparting to said bearing a continuous movement.

23. In a gyro-compass, the combination with an element mounted for orientation, a gyro-rotor casing, a trunnion on the casing, a journal rotatably mounted in the element for supporting the casing for oscillation about a horizontal axis, and electro-magnetic means for continuously oscillating said journal in said element.

24. In gyro-navigational apparatus, the combination with a gyro element, of a supporting ring therefor, bearing means between said element and ring on opposite sides of said element for supporting said element for oscillation about a substantially horizontal axis in said ring and means for imparting continuous relative movement to the parts of said bearing means secured respectively to said ring and element, the relative movement of said parts on one side of the element being opposite to such movement on the opposite side.

In testimony whereof I have affixed my signature.

HARRY L. TANNER.